United States Patent
Hadad et al.

(10) Patent No.: US 6,185,596 B1
(45) Date of Patent: Feb. 6, 2001

(54) APPARATUS & METHOD FOR MODULAR MULTIPLICATION & EXPONENTIATION BASED ON MONTGOMERY MULTIPLICATION

(75) Inventors: Isaac Hadad, Beer Sheva; Benjamin Arazi, Omer; Carmi David Gressel, Mobile Post Negev; Itai Dror, Beer Sheva, all of (IL)

(73) Assignee: Fortress U&T Ltd., Beer Sheva (IL)

( * ) Notice: Under 35 U.S.C. 154(b), the term of this patent shall be extended for 0 days.

(21) Appl. No.: 09/050,958

(22) Filed: Apr. 1, 1998

(30) Foreign Application Priority Data

May 4, 1997 (IL) .......................................... 120776
Jul. 14, 1997 (IL) .......................................... 121311

(51) Int. Cl.[7] ............................................... G06F 7/38
(52) U.S. Cl. ................................................... 708/491
(58) Field of Search ................................... 708/491, 492

(56) References Cited

U.S. PATENT DOCUMENTS

| | | | |
|---|---|---|---|
| 3,621,218 | * 11/1971 | Nishimoto | 708/655 |
| 4,110,832 | * 8/1978 | Leininger et al. | 708/708 |
| 4,514,592 | 4/1985 | Miyaguchi . | |
| 4,538,238 | * 8/1985 | Circello et al. | 708/491 |
| 5,073,870 | 12/1991 | Morita . | |
| 5,101,431 | 3/1992 | Even . | |
| 5,321,752 | 6/1994 | Iwamura et al. . | |
| 5,349,551 | 9/1994 | Petro . | |
| 5,448,639 | 9/1995 | Arazi . | |
| 5,513,133 | 4/1996 | Gressel et al. . | |
| 5,954,788 | * 9/1999 | Suh et al. | 708/491 |

OTHER PUBLICATIONS

P.L. Montgomery, "Modular Multiplication Without Trial Division", Mathematics of Computation, vol. 44, pp. 519–521.

S.R. Dusse and B.S. Kaliski Jr., "A Cryptographic Library For The Motorola DSP 56000", Proc Eurocrypt '90, Springer–Verlag, Berlin.

* cited by examiner

Primary Examiner—Tan V. Mai
(74) Attorney, Agent, or Firm—Merchant & Gould P.C.

(57) ABSTRACT

A modular arithmetic method and microelectronic apparatus therefore, operative to perform a sequence of interleaved Montgomery type multiplications and squaring operations, involves performing a sequence of modular multiplications and squarings using only a single carry save adder. Each multiplication is operative to perform the equivalent of three natural integer multiplication operations using an anticipatory device to determine a $Y_0$ value, such that a result is an exponentiation.

30 Claims, 6 Drawing Sheets

| ROUND | B | SA | SUBT | R=B-(N)*SUBT N=1001 | 2R+NewLS | B(n) | Borrow | Next Subt | Quotient SB | Quotient SA | New LS |
|---|---|---|---|---|---|---|---|---|---|---|---|
| 0 INIT | 1011 | 1101 | 0 | 1011 | - | 0 | 0 | 1 | 0000 | 1101 | 1 |
| 1 | 1011 | 0110 | 1 | 0010 | 00101 | 0 | 1 | 0 | 1000 | 0110 | 0 |
| 2 | 0101 | 0011 | 0 | 0101 | 01010 | 0 | 0 | 1 | 0100 | 0011 | 1 |
| 3 | 1010 | 0001 | 1 | 0001 | 00011 | 0 | 1 | 0 | 1010 | 0001 | 1 |
| 4 | 0011 | 0000 | 0 | 0011 | 00111 | 0 | 1 | 0 | 0101 | 0000 | 0 |
| 5 | 0111 | 1000 | 0 | 0111 | - | - | - | - | 0010 | 1000 | - |
| 6 | | | | | | | | | FINAL QUOTIENT 00010100 | | |

INITIAL CONDITION: DIVIDEND = 187₁₀ = 10111011₂
DIVISOR = 9₁₀ = 1001₂

QUOTIENT = 20₁₀ = 00010100₂
REMAINDER = 7₁₀ = 0111₂

Fig.4

| ROUND | B | SA | SUBT | R=B-(N)*SUBT N=101 | 2R+NewLS | B(n) | Borrow | Next Subt | Quotient SB | Quotient SA | New LS |
|---|---|---|---|---|---|---|---|---|---|---|---|
| 0 INIT | 1010 | 1011 | 0 | 1010 | 1010 | 0 | 0 | 1 | 0000 | 1011 | 1 |
| 1 | 1010 | 0101 | 1 | 0000 | 00001 | 0 | 1 | 0 | 1000 | 0101 | 1 |
| 2 | 0001 | 0010 | 0 | 0001 | 00011 | 0 | 1 | 0 | 0100 | 0010 | 0 |
| 3 | 0011 | 0001 | 0 | 0011 | 00110 | 0 | 1 | 0 | 0010 | 0001 | 1 |
| 4 | 0110 | 0000 | 0 | 0110 | 01101 | 0 | 0 | 1 | 0001 | 0000 | 0 |
| 5 | 1101 | 0000 | 1 | 0011 | 00110 | 0 | 1 | 0 | 1000 | 1000 | 0 |
| 6 | 0110 | 0000 | 0 | 0110 | | | | | 0100 | 0100 | |
| 7 | 0011 SHIFT | | | | | | | | FINAL QUOTIENT 00100010 | | |

INITIAL CONDITION: DIVIDEND = 173₁₀ = 10101101₂

DIVISOR = 5₁₀ = 101₂

QUOTIENT = 34₁₀ = 100010₂

Fig.5

APPARATUS & METHOD FOR MODULAR MULTIPLICATION & EXPONENTIATION BASED ON MONTGOMERY MULTIPLICATION

FIELD OF THE INVENTION

The present invention relates to apparatus and methods for modular multiplication and exponentiation and for serial integer division.

BACKGROUND OF THE INVENTION

A compact microelectronic device for performing modular multiplication and exponentiation over large numbers is described in Applicant's U.S. Pat. No. 5,513,133, the disclosure of which is hereby incorporated by reference.

The disclosures of all publications mentioned in the specification and of the publications cited therein are hereby incorporated by reference.

SUMMARY OF THE INVENTION

The present invention seeks to provide improved apparatus and methods for modular multiplication and exponentiation and for serial integer division.

There is thus provided, in accordance with a preferred embodiment of the present invention, a modular multiplication and exponentiation system including a serial-parallel arithmetic logic unit (ALU) including a single multiplier including a single carry-save adder and preferably including a serial division device operative to receive a dividend of any bit length and a divisor of any bit length and to compute a quotient and a remainder.

Further in accordance with a preferred embodiment of the present invention, the system is operative to multiply at least one pair of integer inputs of any bit length.

Still further in accordance with a preferred embodiment of the present invention, the at least one pair of integer inputs includes two pairs of integer inputs.

Additionally in accordance with a preferred embodiment of the present invention, the ALU is operative to generate a product of integer inputs and to reduce the size of the product without previously computing a zero-forcing Montgomery constant, $J_0$.

Also provided, in accordance with another preferred embodiment of the present invention, is serial integer division apparatus including a serial division device operative to receive a dividend of any bit length and a divisor of any bit length and to compute a quotient and a remainder.

Further in accordance with a preferred embodiment of the present invention, the apparatus includes a pair of registers for storing a pair of integer inputs and which is operative to multiply a pair of integer inputs, at least one of which exceeds the bit length of its respective register, without interleaving.

Also provided, in accordance with yet another preferred embodiment of the present invention, is a modular multiplication and exponentiation system including a serial-parallel multiplying device having only one carry-save accumulator and being operative to perform a pair of multiplications and to sum results thereof.

Additionally provided, in accordance with still another preferred embodiment of the present invention, is a modular multiplication and exponentiation method including providing a serial-parallel arithmetic logic unit (ALU) including a single modular multiplying device having a single carry-save adder, and employing the serial-parallel ALU to perform modular multiplication and exponentiation.

Further provided, in accordance with yet another preferred embodiment of the present invention, is a method for natural (not modular) multiplication of large integers, the method including providing a serial-parallel arithmetic logic unit (ALU) including a single modular multiplying device having a single carry-save adder, and employing the serial-parallel ALU to perform natural (not modular) multiplication of large integers.

Further in accordance with a preferred embodiment of the present invention, the employing step includes multiplying a first integer of any bit length by a second integer of any bit length to obtain a first product, multiplying a third integer of any bit length by a fourth integer of any bit length to obtain a second product, and summing the first and second products with a fifth integer of any bit length to obtain a sum.

Still further in accordance with a preferred embodiment of the present invention, the employing step includes performing modular multiplication and exponentiation with a multiplicand, multiplier and modulus of any bit length.

Additionally in accordance with a preferred embodiment of the present invention, the system also includes a double multiplicand precomputing system for executing Montgomery modular multiplication with only one precomputed constant.

Further in accordance with yet another preferred embodiment of the present invention, is the employing step includes performing Montgomery multiplication including generating a product of integer inputs including a multiplier and a multiplicand, and executing modular reduction without previously computing a Montgomery constant $J_0$.

Further in accordance with a preferred embodiment of the present invention, the Montgomery constant $J_0$ includes a function of $N \bmod 2^k$, where N is a modulus of the modular reduction and k is the bit-length of the multiplicand.

Still further in accordance with a preferred embodiment of the present invention, the employing step includes performing a sequence of interleaved Montgomery multiplication operations.

Additionally in accordance with a preferred embodiment of the present invention, each of the interleaved Montgomery multiplication operations is performed without previously computing the number of times the modulus must be summated into a congruence of the multiplication operation in order to force a result with at least k significant zeros.

Still further in accordance with a preferred embodiment of the present invention, the system also includes a data preprocessor operative to collect and serially summate multiplicands generated in an i'th interleaved Montgomery multiplication operation thereby to generate a sum and to feed in the sum to an (i+1)'th Montgomery multiplication operation.

Additionally in accordance with a preferred embodiment of the present invention, the function includes an additive inverse of a multiplicative inverse of $N \bmod 2^k$.

Further in accordance with a preferred embodiment of the present invention, the method also comprises computing $J_0$ by resetting $A_i$ and B to zero and setting $S_0=1$.

The present invention also relates to a compact microelectronic arithmetic logic unit, ALU, for performing modular and normal (natural, non-negative field of integers) multiplication, division, addition, subtraction and exponentiation over very large integers. When referring to modular multiplication and squaring using Montgomery methods, reference is made to the specific parts of the device as a modular arithmetic coprocessor, and the acronym, MAP, is used. Reference is also made to the Montgomery multiplication methods as MM.

The present invention also relates to arithmetic processing of large integers. These large numbers can be in the natural field of (non-negative) integers or in the Galois field of prime numbers, GF(p), and also of composite prime moduli. More specifically, the invention relates to a device that can implement modular multiplications/exponentiations of large numbers, which is suitable for performing the operations essential to Public Key Cryptographic authentication and encryption protocols, which work over increasingly large operands and which cannot be executed efficiently with present generation modular arithmetic coprocessers, and cannot be executed securely with software implementations. The invention can be driven by any 4 bit or longer processor, achieving speeds which can surpass present day digital signal processors.

The present invention also relates to the hardware implementation of large operand integer arithmetic, especially as concerns the numerical manipulations in a derivative of a procedure known as the interleaved Montgomery multiprecision modular multiplication method often used in encryption software oriented systems, but also of intrinsic value in basic arithmetic operations on long operand integers; in particular, A·B+C·D+S, wherein there is no theoretical limit on the sizes of A, B, C, D, or S. In addition, the device is especially attuned to perform modular multiplication and exponentiation. The basic device is particularly suited to be a modular arithmetic co-processor (MAP), also including a device for performing division of very large integers, wherein the divisor can have a bit length as long as the modulus register N and the bit length of the dividend can be as large as the bit length of two concatenated registers.

This device preferably performs all of the functions of U.S. Pat. No. 5,513,133, with the same order of logic gates, in less than half the number of machine clock cycles. This is mostly because there is only one double action serial/parallel multiplier instead of two half size multipliers using the same carry save accumulator mechanism, the main component of a conventional serial parallel multiplier. The new arithmetic logic unit, ALU, or specifically the modular arithmetic coprocessor, MAP, preferably intrinsically obviates a separate multiplication process which would have preceded the new process. This process would also have required a second Montgomery constant, $J_0$, which is now also preferably obviated. Stated differently, instead of the two constants in the previous Montgomery procedures, and the delays encountered, only one constant is now computed, and the delay caused by the now superfluous J type multiplications (explained later) is preferably removed.

Further, by better control of the data manipulations, between the CPU and this peripheral device, operands which are performed on operand, longer than the natural register size of the device, can preferably be performed at reduced processing times using less temporary storage memory.

Three related methods are known for performing modular multiplication with Montgomery's methodology. [P. L. Montgomery, "Modular Multiplication without trial division", *Mathematics of Computation*, vol. 44, pp.519–521, 1985], hereinafter referred to as "Montgomery", [S. R. Dussé and B. S. Kaliski Jr., "A cryptographic library for the Motorola DSP 56000", *Proc Eurocrypt'90*, Springer-Verlag, Berlin, 1990] hereinafter referred to as "Dussé" the method of U.S. Pat. No. 4,514,592 to Miyaguchi, and the method of U.S. Pat. No. 5,101,431, to Even, and the method of U.S. Pat. No. 5,321,752 to Iwamura, and the method of U.S. Pat. No. 5,448,639, to Arazi, and the method of U.S. Pat. No. 5,513,133 to Gressel.

The preferred architecture is of a machine that can be integrated to any microcontroller design, mapped into the host controller's memory; while working in parallel with the controller which for very long commands constantly swap or feed operands to and from the data feeding mechanism, allowing for modular arithmetic computations of any popular length where the size of the coprocessor volatile memory necessary for manipulations should rarely be more than three times the length of the largest operand.

This solution preferably uses only one multiplying device which inherently serves the function of two multiplying devices, in previous implementations. Using present popular technologies, it enables the integration of the complete solution including a microcontroller with memories onto a 4 by 4.5 by 0.2 mm microelectronic circuit.

The invention is also directed to the architecture of a digital device which is intended to be a peripheral to a conventional digital processor, with computational, logical and architectural novel features relative to the processes published by Montgomery and Dusse, as described in detail below.

A concurrent process and a unique hardware architecture are provided, to perform modular exponentiation without division preferably with the same number of operations as would be performed with a classic multiplication/division device, wherein a classic device would perform both a multiplication and a division on each operation. A particular feature of a preferred embodiment of the present invention is the concurrency of operations performed by the device to allow for unlimited operand lengths, with uninterrupted efficient use of resources, allowing for the basic large operand integer arithmetic functions.

The advantages realized by a preferred embodiment of this invention result from a synchronized sequence of serial processes, which are merged to simultaneously (in parallel) achieve three multiplication operations on n bit operands, using one multiplexed k bit serial/parallel multiplier in (n+k) effective clock cycles, accomplishing the equivalent of three multiplication computations, as prescribed by Montgomery.

By synchronizing and on the fly detecting and on the fly preloading and simultaneous addition of next to be used operands, the machine operates in a deterministic fashion, wherein all multiplications and exponentiations are executed in a predetermined number of clock cycles. Conditional branches are replaced with local detection and compensation devices, thereby providing a basis for the simple type control mechanism, which, when refined, typically include a series of self-exciting cascaded counters. The basic operations herein described can be executed in deterministic time using the device described in U.S. Pat. No. 5,513,133 as manufactured both by Motorola in East Kilbride, Scotland under the trade name SC-49, and by SGS-Thomson in Rousset, France, under the trade name ST16-CF54.

The machine has particularly lean demands on volatile memory for most operations, as operands are loaded into and stored in the device for the total length of the operation; however, the machine preferably exploits the CPU onto which it is appended, to execute simple loads and unloads, and sequencing of commands to the machine, whilst the machine performs its large number computations. The exponentiation processing time is virtually independent of the CPU which controls it. In practice, no architectural changes are necessary when appending the machine to any CPU. The hardware device is self-contained, and can be appended to any CPU bus.

Apparatus for accelerating the modular multiplication and exponentiation process is preferably provided, including means for precomputing the necessary constants.

The preferred embodiments of the invention described herein provide a modular mathematical operator for public key cryptographic applications on portable Smart Cards, typically identical in shape and size to the popular magnetic stripe credit and bank cards. Similar Smart Cards (as per U.S. Pat. No. 5,513,133) are being used in the new generation of public key cryptographic devices for controlling access to computers, databases, and critical installations; to regulate and secure data flow in commercial, military and domestic transactions; to decrypt scrambled pay television programs, etc. It should be appreciated that these devices are also incorporated in computer and fax terminals, door locks, vending machines, etc.

The hardware described carries out modular multiplication and exponentiation by applying the $P$ operator in a novel way. Further, the squaring can be carried out in the same method, by applying it to a multiplicand and a multiplier that are equal. Modular exponentiation involves a succession of modular multiplications and squarings, and therefore is carried out by a method which comprises the repeated, suitably combined and oriented application of the aforesaid multiplication, squaring and exponentiation methods.

When describing the workings of a preferred embodiment of the ALU we describe synchronization in effective clock cycles, referring to those cycles when the unit is performing an arithmetic operation, as opposed to real clock cycles, which would include idle cycles whence the ALU may stand, and multiplexers, flipflops, and other device settings may be altered, in preparation for a new phase of operations.

In a preferred embodiment, a method for executing a Montgomery modular multiplication, (with reference to squaring and normal multiplication) wherein the multiplicand A (which may be stored either in the CPU's volatile RAM or in the $S_A$ register, 130, the multiplier B in the B register 1000, which is concatenation of 70 and 80 and the modulus N in the N register, 1005, which is a concatenation of 200 and 210; comprise m characters of k bits each, the multiplicand and the multiplier generally not being greater than the modulus, comprises the steps of:

1)—loading the multiplier B and the modulus, N, into respective registers of n bit length, wherein n=m·k;
   {multiplying in normal field positive, natural, integers, N is a second multiplier}
   {if n is longer than the B, N and S registers, values are typically loaded and unloaded in and out of these registers during the course of an iteration, allowing the machine to be virtually capable of manipulating any length of modulus}

2)—setting the output of the register $S_B$ to zero, S*d Flush (250)=1 for the first iteration;

3)—resetting extraneous borrow and carry flags (controls, not specified in the patent);

4)—executing m iterations, each iteration comprising the following operations:

($0 \leq i \leq m-1$)

a) transferring the next character $A_{i-1}$ of the multiplicand A from volatile storage to the Ai Load Buffer, 290.

b) simultaneously serially loading the Ci Load Buffer, 320, with $N_0$ (the LS k bits of N), while rotating the contents of the Ai Load Buffer, thereby serially adding the contents of the Ai load buffer with $N_0$ by means of the serial adder FA1, 330, thereby serially loading the Ai+Ci Load Buffer with th(sum $N_0+A_{i-1}$, The preloading phase ends here. This phase is typically executed whilst the MAP was performing a previous multiplication iteration. Processes a) and b) can be executed simultaneously, wherein the $A_{i-1}$ character is loaded into its respective register, whilst the Ai stream is synchronized with the rotation of the $N_0$ register, loading R2, 320. Simultaneously, the Ai stream and the $N_0$ stream are summated and loaded into the R3 register, 340.

Squaring a quantity from the B register, can be executed wherein at the initialization, Steps a) and b) the first k bits of Bd are inserted into R1, as the $B_0$ register is rotated, simultaneously with the $N_0$ register. Subsequent k bit $B_i$ strings are preloaded into the R1 register, as they are fed serially into the ALU.

c) the machine is stopped. Operands in buffers R1, R2, and R3 are latched into latches L1, 360; L2, 370; and L3, 380.

The L0—"0" latch, is a pseudo latch, as this is simply a literal command signal entering each of the AND gates in the inputs or outputs of the 390, multiplexer.

for the next k effective clock cycles
      i) at each effective clock cycle the Y0 SENSE anticipates the next bit of $Y_0$ and loads this bit through M3 multiplexer, 300, into the Ci Load Buffer, while shifting out the Ai bits from the R1 register and simultaneously loading the Ci Load Buffer with k bits of $Y_0$ and adding the output of R1 with $Y_0$ and loading this value into the R3 Buffer, ii) simultaneously multiplying $N_0$ (in L2, Ci Latch) by the incoming $Y_0$ bit, and multiplying Ai by the next incoming bit of Bd, by means of logically choosing through the M_K multiplexer, 390, the desired value from one of the four latches, L0, L1, L2, or L3; thereby adding the two results. If neither the $Y_0$ bit nor the B bit is one, an all zero value is multiplexed into the CSA, if only the $N_0$ bit is one, $N_0$ alone is multiplexed/added into the CSA, if only the B bit is a one, $A_{i-1}$ is added into the CSA, if both the B bit and the $N_0$ bit are ones, then $A_{i-1}+N_0$ are added into the CSA, iii) then adding to this summation; as it serially exits the Carry Save k+1 Bit Accumulator bit by bit, (the X stream); the next relevant bit of Sd in through the serial adder, FA2, 460.

In MM these first k bits of the Z stream are zero. In this first phase the result of $Y_0 \cdot N_0 + A_{i-1} \cdot B_0 + S_0$ has been computed, the LS k all zero bits appeared on the Z*out stream, and the MS k+1 bits of the multiplying device are saved in the CSA Carry Save Accumulator; the R1, R2 and R3 preload buffers hold the values $A_{i-1}$, $Y_0$ and $Y_0+A_{i-1}$, respectively.

e) at the last effective, (m+1)·k'th, clock cycle he machine is stopped, buffers R2, and R3 are latched into L2, and L3

The value of L1 is unchanged.

The initial and continuing conditions for the next k·(m−1) effective clock cycles are:

the multipliers are the bit streams from B, starting from the k'th bit of B and the remaining bit stream from N, also starting from the k'th bit of N;

and the multiplicands in L1, L2, and L3 are $A_{i-1}$, $Y_0$, and $Y_0+A_{i-1}$, at the start the CS adder contains the value as described in d), and the S stream will feed in the next k·(m−1) bits into the FA2 full adder;

during the next k·m effective clock cycles, Nd, delayed k clock cycles in unit 470, is subtracted in serial subtractor, 480, from the Z stream, to sense if (Z/$2^k$ mod $2^{k \cdot m}$), the result which is to go into the B or S register, is larger than or equal to N. Regardless of what is sensed by the serial subtractor, 460, if at the {(m+1)·k}'th effective clock cycle, the $SO_1$ flip-flop of the CSA is a one, then the total result is certainly larger than N, and N will be subtracted from the result, as the result, partial or final, exits its register.

f) for the next k·(m−1) effective clock cycles:
the $N_0$ Register, 210, is rotated either synchronously with incoming $A_i$ bits, or at another suitable timing, loading R1, R2, and R3, as described in a) and b), for the next iteration, for these k·(m−1) effective clock cycles, the remaining MS bits of N now multiply $Y_0$, the remaining MS B bits continue multiplying $A_{i-1}$. If neither the N bit nor the B bit is one, an all zero value is multiplexed into the CSA. If only the N bit is one, $Y_0$ alone is multiplexed/added into the CSA. If only the B bit is a one, $A_{i-1}$ is added into the CSA. If both the B bit and the $Y_0$ bit are ones, then $A_{i-1}+Y_0$ are added into the CSA.

Simultaneously the serial output from the CSA is added to the next k·(m−1) S bits through the FA2 adder, unit 460, which outputs the Z stream, the relevant part of the Z output stream is the first non-zero k·(m−1) bits of Z.

The Z stream is switched into the $S_B$ register, for the first m−1 iterations and into the $S_B$ or B register, as defined for the last iteration;

on the last iteration, the Z stream, which, disregarding the LS k zero bits, is the final B* stream. This stream is directed to the B register, to be reduced by N, if necessary, as it is used in subsequent multiplications and squares;

on the last iteration, Nd, delayed k clock cycles, is subtracted by a serial subtractor from the Z stream, to sense if the result, which goes into B, is larger than or equal to N.

At the end of this stage, all the bits from the N, B, and $S_B$ registers have been fed into the ALU, and the final k+1 bits of result are in the CSA, ready to be flushed out.

g) the device is stopped. The S flush, 250; the B flush, 240; and the N flush, 260; are set to output zero strings, to assure that in the next phase the last k+1 most significant bits will be flushed out of the CSA. (In a regular multiplication, the M7 MUX, 450, is set to accept the Last Carry from the previous iteration of S.) S has m·k+1 significant bits, but the S register has only mk cells to receive this data. This last bit is intrinsically saved in the overflow mechanism.

As was explained in e, Nd, delayed k clock cycles in 470, is subtracted from the Z stream, synchronized with the significant outputs from X, to provide a fine-tune to the sense mechanism to determine if the result which goes into the B or S register is larger than or equal to N. 480 and 490 comprise a serial comparator device, where only the last borrow command bit for modular calculations, and the (k·m+1)'th bit for regular multiplications in the natural field of integers are saved.

this overflow/borrow command is detected at the m·k'th effective clock cycle.

h) The device is clocked another k cycles, completely flushing out the CSA, while another k bits are exiting Z to the defined output register.

The instruction to the relevant flip flop commanding serial subtractor 90 or 500 to execute a subtract of N on the following exit streams is set at the last effective, (m+1)·k'th, clock cycle, of the iteration if (Z/$2^k$−N)≧N (Z includes the m·k'th MS bit), sensed by, the following signals:

the $SO_1$ bit, which is the data out bit from second least significant cell of the CSA, is a one, or if the $CO_Z$ bit, which is the internal carry out in the X+S adder, 460, is a one.

or if the borrow bit from the 480 sense subtractor is not set.

This mechanism appears in U.S. Pat. No. 5,513,133 as manufactured both by Motorola and SGS-Thomson.

For multiplication in the field of natural numbers, it is preferable to detect an overflow, if the m−k'th MS bit is a one, can happen in the superscalar multiplier, and cannot happen in the mechanism of U.S. Pat. No. 5,513,133. This overflow can then be used in the next iteration to insert a MS one in the S (temporary result) stream.

j) is this the last iteration
NO, return to c)
YES continue to m)

k) the correct value of the result can now exit from either the B or S register.

$Y_0$ bits are anticipated in the following manner in the Y0S−Y0SENSE unit, 430, from five deterministic quantities:

i the LS bit of the Ai−L1 Latch AND the next bit of the Bd Stream; $A_0 \cdot B_d$;

ii the LS Carry Out bit from the Carry Save Accumulator; $CO_0$;

iii the $S_{out}$ bit from the second LS cell of the CSA; $SO_1$;

iv the next bit from the S stream, $S_d$, v the Carry Out bit from the 460, Full Adder; $CO_Z$;

These five values are XORed together to produce the next $Y_0$ bit; $Y_{0i}$:

$$Y_{0i}=A_0 \cdot B_d \oplus CO_0 \oplus SO_1 \oplus S_d \oplus CO_Z$$

If the $Y_{0i}$ bit is a one, then another N of the same rank (multiplied by the necessary power of 2), is typically added, otherwise, N, the modulus, is typically not added.

Multiplication of long natural integers in the normal field of numbers.

This apparatus is suited to efficiently perform multiplications and summations of normal integers. If these operands are all of no longer than k bit length, the process preferably is executed without interleave, where the Z stream of 2k+1 bits are directed to final storage. For integers longer than k bits, the process is similar to the predescribed interleaved modular arithmetic process, excepting that the result will now potentially be one bit longer than twice the length of the longest operand. Further the apparatus of the invention is capable, using the resources available in the described device, to simultaneously perform two separate multiplications, A, multiplicand, preferably loaded in segments in the R1—Ai register, times B, the multiplier, of A, preferably loaded into the B register as previously designated, plus N, a second multiplier, preferably loaded into the N register, times an operand, C, loaded into the R2 Register, plus S, a bit stream entering the apparatus, on the first iteration, only from the Sd, signal line, preferably from the $S_A$ register. The Y0 SENSE apparatus is not used. The multiplicands are summated into the R3 register prior to the initiation of an iteration. At initiation of the iteration, registers R1, R2, and R3 are copied into latches L1, L2, and L3 until the end of an iteration. Meanwhile, during the mk+k+1 effective clock cycles of an iteration, the next segments of A and C are again preloaded and summated in preparation for the next iteration.

At each iteration, the first LS k bits of the result on the Z stream, which are, now, (not by definition zero, as in MM) directed to a separate storage, vacated to accumulate the LS portion of the result, again suitably the SA register. The most significant mk+1 bits comprise the $S_B$, temporary quantity, for the next iteration. In the last phase, similar to g, i, and j, the CSA is flushed out of accumulated value. The LS portion, for numbers which are longer than the multiplier registers, can be exited through the normal data out register and unloader, units 60 and 30, respectively.

The MS, 2m'th bit of the result is read from the LAST CARRY bit of the FA2, unit 460, through the OVERFL0W signal line.

BRIEF DESCRIPTION OF THE DRAWINGS

The present invention will be understood and appreciated from the following detailed description, taken in conjunction with the drawings in which:

FIG 4 is a table showing stages of operation of a division of a dividend by a divisor using the division apparatus of FIG. 2, for an example wherein the effective bit-length of the divisor is half of the effective bit-length of the dividend; and FIG. 5 is a table showing stages of operation of a division of a dividend by a divisor using the division apparatus of FIG. 2, for an example wherein the effective bit-length of the divisor is less than half of the effective bit-length of the dividend.

DESCRIPTION OF PREFERRED EMBODIMENTS

Figure 1A:
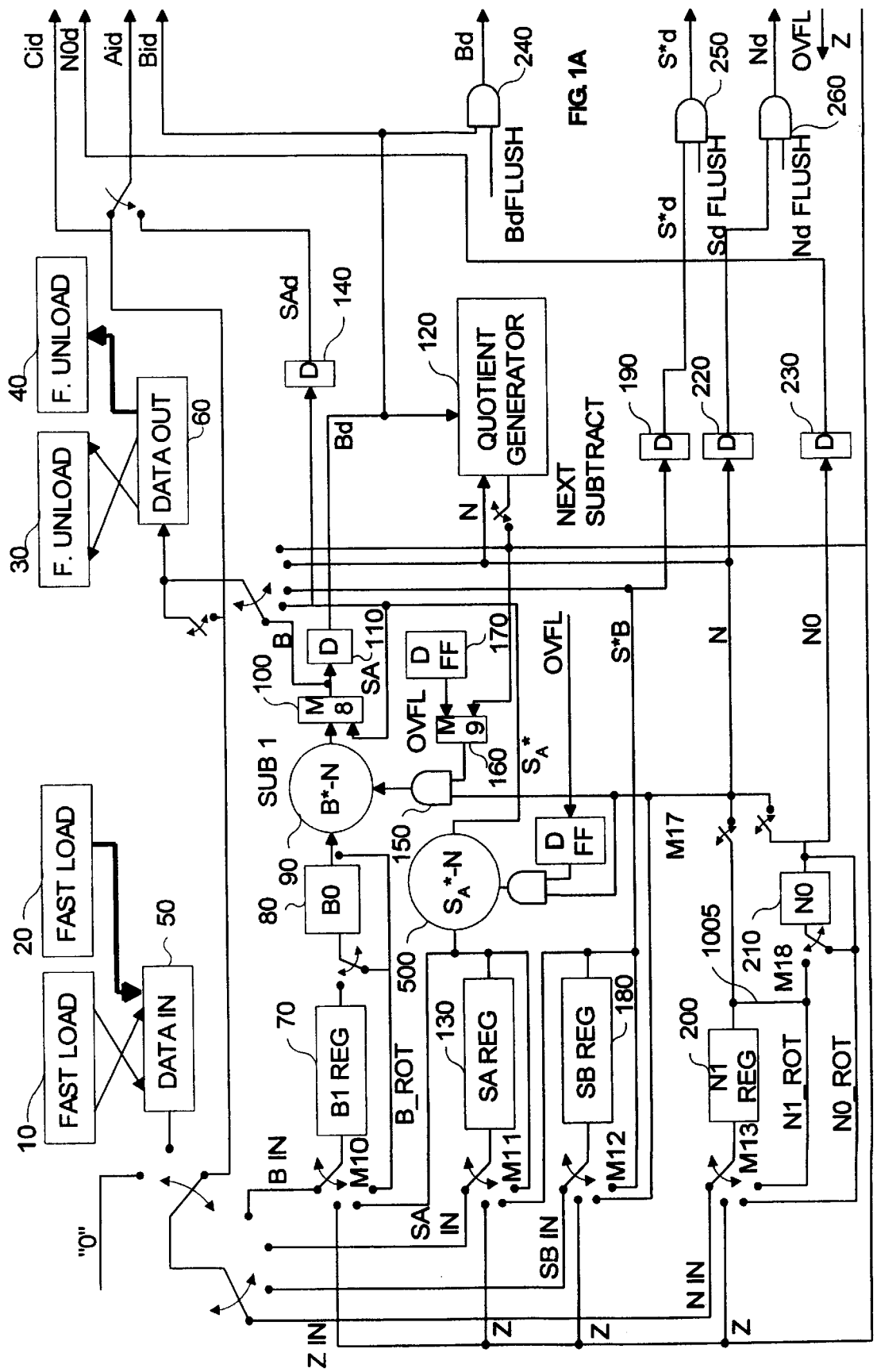
FIGS. 1A–1B, taken together, form a simplified block diagram of a serial-parallel super scalar arithmetic logic unit (ALU) constructed and operative in accordance with one embodiment of the present invention.
Figure 1B:
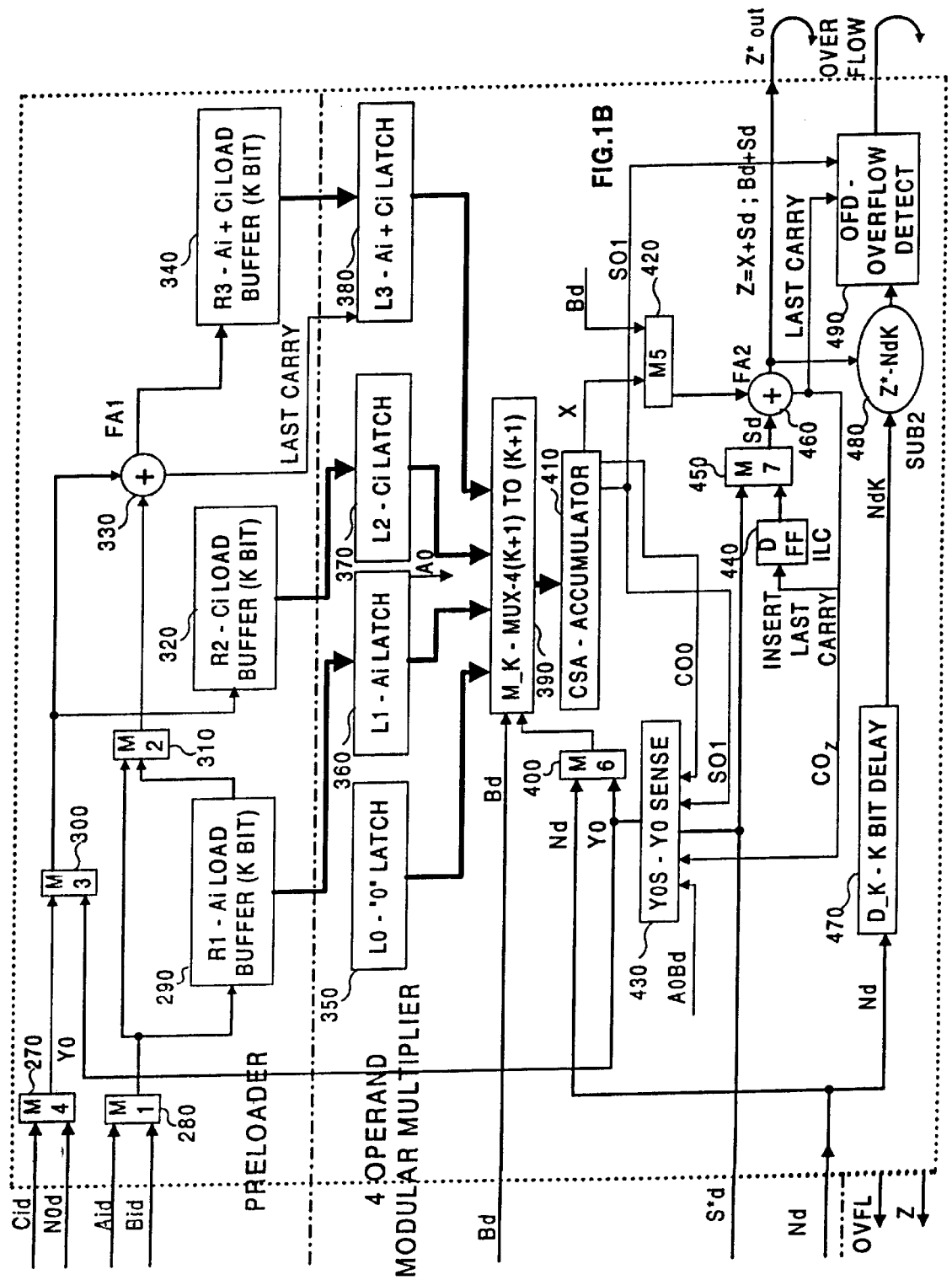

FIGS. 1A–1B, taken together, form a simplified block diagram of a serial-parallel arithmetic logic unit (ALU) constructed and operative in accordance with a preferred embodiment of the present invention. The apparatus of FIGS. 1A–1B, preferably include the following components:

Single Multiplexers—Controlled Switching Elements which select one signal or bit stream from a multiplicity of inputs of signals and direct it this chosen signal to a single output. Multiplexers are marked M1 to M13, and are intrinsic parts of larger elements.

M_K Multiplexer, 390, is an array of k+1 single multiplexers, and chooses which of the four k or k+1 inputs are to be added into the CSA, 410.

The B (1000), $S_A$ (130), $S_B$ (180), and N (1005) are the four main serial main registers in a preferred embodiment. The $S_A$ is conceptually and practically redundant, but can considerably accelerate very long number computations, and save volatile memory resources, especially in the case where the length of the modulus is 2·k·m bits long, and also simplify long division computations.

Serial Adders and Serial Subtractors are logic elements that have two serial inputs and one serial output, and summate or perform subtraction on two long strings of bits. Components 90 and 480 are subtractors, 330, and 460 are serial adders. The propagation time from input to output is very small. Serial subtractor 90 reduces B* to B if B* is larger than or equal to N. Serial Subtractor 480, is used, as part of a comparator component to detect if B* will be larger than or equal to N. Full Adder 330, adds the two bit streams which feed the Load Buffer; 340, with a value that is equal to the sum of the values in the 290 and 320 Load Buffers.

Fast Loaders and Unloaders, 10 and 20, and 30 and 40, respectively, are devices to accelerate the data flow from the CPU controller. This can comprise of DMA or other hardware accelerators, in a preferred embodiment. 20 and 40 are for reversing the data word, as is necessary for reconciling the division input and output of FIG. 2.

Data In, 50, is a parallel in serial out device, as the present ALU device is a serial fed systolic processor, and data is fed in, in parallel, and processed in serial.

Data Out, 60, is a serial in parallel out device, for outputting results from the coprocessor. The quotient generator is that part of FIG. 2 which generates a quotient bit at each iteration of the dividing mechanism.

Flush Signals on Bd, 240; on S*d, 250; and on Nd, 260, are made to assure that the last k+1 bits can flush out the CSA, as the alternative would be a complicated k+1 bit parallel output element to retrieve the MS k+1 bits of the accumulator.

Load Buffers R1, 290; R2, 320; and R3, 340 are serial in parallel out shift registers adapted to receive the three possible more than zero multiplicand combinations.

Latches L1, 360; L2, 370; and L3, 380; are made to receive the outputs from the load buffers, thereby allowing the load buffers, the temporal enablement to process the next phase of data before this data is preferably latched into L2, L2, and L3.

Y0 Sense, 430, is the logic device which determines the number of times the modulus is accumulated, in order that a k bit string of LS zeros will exit at Z in Montgomery Multiplications and squares.

One bit delay devices 100, 220 and 230 are inserted in the respective data streams to accommodate for synchronization problems between the data preparation devices in FIG. 1A, and the data processing devices in FIG. 1B.

The k bit delay, shift register, 470, assures that if $Z/2^k$ is larger than or equal to N, the comparison of $Z/2^k$ and N will be made with synchronization.

The Carry Save Accumulator is almost identical to a serial/parallel multiplier, excepting for the fact that three different larger than zero values can be summated, instead of the single value as usually is latched onto the input of the s/p multiplier.

The Insert Last Carry, 440, is used to insert the mk+1'th bit of the S stream, as the S register is only mk bits long.

The borrow/overflow detect, 490, can either detect if a result is larger than or equal to the modulus (from N), or if the mk'th bit is a one.

The control mechanism is not depicted, but is preferably understood to be a set of cascaded counting devices, with switches set for systolic data flow.

For modular multiplication in the prime and composite prime field of numbers, we define A and B to be the multiplicand and the multiplier, and N to be the modulus which is usually larger than A or B. N also denotes the register where the value of the modulus is stored. N, may, in some instances, be smaller than A. We define A, B, and N as m k=n bit long operands. Each k bit group will be called a character, the size of the group defined by the size of the multiplying device. Then A, B, and N are each m characters long. For ease in following the step by step procedural explanations, assume that A, B, and N are 512 bits long, (n=512); assume that k is 64 bits long because of the present cost effective length of such a multiplier, and data manipulation speeds of simple CPUs; and m=8 is the number of characters in an operand and also the number of iterations in a squaring or multiplying loop with a 512 bit operand. All operands are positive integers. More generally, A, B, N, n, k and m may assume any suitable values.

In non-modular functions, the N and S registers can be used for temporary storage of other arithmetic operands.

We use the symbol, ≡, to denote congruence of modular numbers, for example 16≡2 mod 7, and we say 16 is congruent to 2 modulo 7 as 2 is the remainder when 16 is divided by 7. When we write Y mod N≡X mod N; both Y and X may be larger than N; however, for positive X and Y, the remainders will be identical. Note also that the congruence of a negative integer Y, is Y+u N, where N is the modulus, and if the congruence of Y is to be less than N, u will be the smallest integer which will give a positive result.

We use the symbol, ¥, to denote congruence in a more limited sense. During the processes described herein, a value is often either the desired value, or equal to the desired value plus the modulus. For example X¥2 mod 7. X can be equal to 2 or 9. We say X has limited congruence to 2 mod 7.

When we write X=A mod N, we define X as the remainder of A divided by N; e.g., 3=45 mod 7.

In number theory the modular multiplicative inverse is a basic concept. For example, the modular multiplicative inverse of X is written as $X^{-1}$, which is defined by X $X^{-1}$ mod N=1. If X=3, and N=13, then $X^{-1}$=9, i.e., the remainder of 3·9 divided by 13 is 1.

The acronyms MS and LS are used to signify most significant and least significant when referencing bits, characters, and full operand values, as is conventional in digital nomenclature.

Throughout this specification N designates both the value N, and the name of the shift register which contains N. An asterisk superscript on a value, denotes that the value, as stands, is potentially incomplete or subject to change. A is the value of the number which is to be exponentiated, and n is the bit length of the N operand. After initialization when A is "Montgomery normalized" to A* (A*=$2^n$A—to be explained later) A* and N are constant values throughout the intermediate step in the exponentiation. During the first iteration, after initialization of an exponentiation, B is equal to A*. B is also the name of the register wherein the accumulated value which finally equals the desired result of exponentiation resides. S* designates a temporary value, and S, $S_A$ and $S_B$ designate, also, the register or registers in which all but the single MS bit of S is stored. (S* concatenated with this MS bit is identical to S.) S(i−1) denotes the value of S at the outset of the i'th iteration; $S_0$ denotes the LS character of an S(i)'th value.

We refer to the process, (defined later) $\mathcal{P}(A \cdot B)N$ as multiplication in the P field, or sometimes, simply, a multiplication operation.

As we have used the standard structure of a serial/parallel multiplier as the basis for constructing a double acting serial parallel multiplier, we differentiate between the summating part of the multiplier, which is based on carry save accumulation, (as opposed to a carry look ahead adder, or a ripple adder, the first of which is considerably more complicated and the second very slow), and call it a carry save adder or accumulator, and deal separately with the preloading mechanism and the multiplexer and latches, which allow us to simultaneously multiply A times B and C times D, summate both results, e.g., A·B+C·D, converting this accumulator into a very powerful engine. Additional logic is added to this multiplier in order to provide for an anticipated sense operation necessary for modular reduction and serial summation necessary to provide powerful modular arithmetic and ordinary integer arithmetic on very large numbers.

Montgomery Modular Multiplication

In a classic approach for computing a modular multiplication, A·B mod N, the remainder of the product A·B is computed by a division process. Implementing a conventional division of large operands is more difficult to perform than serial/parallel multiplications.

Using Montgomery's modular reduction method, division is essentially replaced by multiplications using two precomputed constants. In the procedure demonstrated herein, there is only one precomputed constant, which is a function of the modulus. This constant is, or can be, computed using this ALU device.

A simplified presentation of the Montgomery process, as is used in this device is now provided, followed by a complete preferred description.

If we have an odd number (an LS bit one), e.g., 1010001 (=$81_{10}$) we can always transform this odd number to an even number (a single LS bit of zero) by adding to it another fixing, compensating odd number, e.g., 1111 (=$15_{10}$); as 1111+1010001=1100000 ($96_{10}$). In this particular case, we have found a number that produced five LS zeros, because we knew in advance the whole string, 81, and could easily determine a binary number which we could add to 81, and would produce a new binary number that would have as many LS zeros as we might need. This fixing number is be odd, else it has no effect on the progressive LS bits of a result.

If our process is a clocked serial/parallel carry save process, where it is desired to have a continuous number of LS zeros, and wherein at each clock cycle we only have to fix the next bit, at each clock it is sufficient to add the fix, if the next bit would potentially be a one or not to add the fix if the potential bit were to be a zero. However, in order not to cause interbit overflows (double carries), this fix is preferably summated previously with the multiplicand, to be added into the accumulator when the relevant multiplier bit is one, and the Y Sense also detects a one.

Now, as in modular arithmetic, we only are interested in the remainder of a value divided by the modulus, we know that we can add the modulus any number of times to a value, and still have a value that would have the same remainder. This means that we can add YN=$\Sigma y_i 2^i$ N to any integer, and still have the same remainder; Y being the number of times we add in the modulus, N, to produce the required LS zeros.

As described, the modulus that we add can only be odd. Methods exist wherein even moduli are defined as $2^i$ times the odd number that results when i is the number of LS zeros in the even number.

The problem solved by the Montgomery interleaved variations, is aimed at reducing the limited storage place we have for numbers, and the cost effective size of the multipliers. This is especially useful when performing public key cryptographic functions where we are constantly multiplying one large integer, e.g., n=1024 bit, by another large integer; a process that would ordinarily produce a double length 2048 bit integer.

We can add in Ns (the modulus) enough times to A·B=X or A·B+S=X during the process of multiplications (or squaring) so that we will have a number, Z, that has n LS zeros, and, at most, n+1 MS bits.

We can continue using such numbers, disregarding the LS n bits, if we remember that by disregarding these zeros, we have divided the desired result by $2^n$.

When the LS n bits are disregarded, and we only use the most significant n (or n+1) bits, then we have effectively multiplied the result by $2^{-n}$, the modular inverse of $2^n$. If we would subsequently re-multiply this result by $2^n$ mod N (or $2^n$) we would obtain a value congruent to the desired result (having the same remainder) as A·B+S mod N. As is seen, using MM, the result is preferably multiplied by $2^{2n}$ to overcome the $2^{-n}$ parasitic factor reintroduced by the MM.

EXAMPLE

A·B+S mod N=(12·11+10) mod 13=(1100·1011+1010)$_2$ mod 1011$_2$.

We will add in $2^i$ N whenever a fix is necessary on one of the n LS bits.

| | B | 1011 | |
|---|---|---|---|
| x | A | 1100 | |
| add | S | 1010 | |
| add | A(0)·B | 0000 | |
| | ---- | | sum of LS bit = 0 not add N |
| add | $2^0$(N·0) | 0000 | |
| sum | | 0101 | →0 LS bit leaves carry save adder |
| add | A(1)·B | 0000 | |
| | ---- | | sum of LS bit = 0 – add N |
| add | $2^1$(N·1) | 1101 | |
| sum | | 1001 | →0 LS bit leaves CS adder |
| add | A(2)·B | 1011 | |
| | ---- | | sum LS bit = 0 don't add N |
| add | $2^2$(N·0) | 0000 | |
| sum | | 1010 | →0 LS bit leaves CS adder |
| add | A(3)·B | 1011 | |
| | ---- | | sum LS bit = 1 add N |
| add | $2^{3(N\cdot1)}$ | 1101 | |
| sum | | 10001 | →0 LS bit leaves CS adder |

And the result is 10001 0000$_2$ mod 13=17·$2^4$ mod 13.
As 17 is larger than 13 we subtract 13, and the result is: 17·$2^4$≡4·$2^4$ mod 13.
formally $2^{-n}$(AB+S)mod N=9 (12·11+10) mod 13≡4.

In Montgomery arithmetic we utilize only the MS non-zero result (4) and effectively remember that the real result has been divided by $2^n$; n zeros having been forced onto the MM result.

We have added in (8+2)·13=10·13 which effectively multiplied the result by $2^4$ mod 13≡3. In effect, had we used the superfluous zeros, we can say that we have performed, AB·B+Y·N+S–(12·11+10·13+10) in one process, which will be described possible on a preferred embodiment.

Check–(12·11+10) mod 13=12; 4·3=12.

In summary, the result of a Montgomery Multiplication is the desired result multiplied by $2^{-n}$.

To retrieve the previous result back into a desired result using the same multiplication method, we would have to Montgomery Multiply the previous result by $2^{2n}$, which we will call H, as each MM leaves us with a parasitic factor of $2^{-n}$.

The Montgomery Multiply function ℘(A·B)N performs a multiplication modulo N of the A·B product into the P field. (In the above example, where we derived 4). The retrieval from the P field back into the normal modular field is performed by enacting P on the result of ℘(A·B)N using the precomputed constant H. Now, if P=℘(A·B)N, it follows that ℘(P·H)N≡A·B mod N; thereby performing a normal modular multiplication in two P field multiplications.

Montgomery modular reduction averts a series of multiplication and division operations on operands that are n and 2n bits long, by performing a series of multiplications, additions, and subtractions on operands that are n or n+1 bits long. The entire process yields a result which is smaller than or equal to N. For given A, B and odd N there is always a Q, such that A·B+Q·N will result in a number whose n LS bits are zero, or:

P·$2^n$=A·B+Q·N

This means that we have an expression 2n bits long, whose n LS bits are zero.

Now, let I·$2^n$=1 mod N (I exists for all odd N). Multiplying both sides of the previous equation by I yields the following congruences:
from the left side of the equation:

P·I·$2^n$=P mod N; (Remember that I·$2^n$±1 mod N)

and from the right side:

A·B·I+Q·N·I≡AB·I mod N; (Remember that Q·N·I≡0 mod N)

therefore:

P≡A·B·I mod N.

This also means that a parasitic factor I=$2^{-n}$ mod N is introduced each time a P field multiplication is performed.
We define the P operator such that:

P=A·B·I mod N≡℘(A·B)N.

and we call this "multiplication of A times B in the P field", or Montgomery Multiplication. The retrieval from the P field can be computed by operating ℘ on P·H, making:

℘(P·H)N≡A·B mod N;

We can derive the value of H by substituting P in the previous congruence. We find:
℘(P·H)N≡(A·B·I)(H)(I) mod N;

(see that A·B·I←P; H←H; I← and any multiplication operation introduces a parasitic I)
If H is congruent to the multiple inverse of $I^2$ then the congruence is valid, therefore:

H=$I^{-2}$ mod N≡$2^{2n}$ mod N (H is a function of N and we call it the H parameter)

In conventional Montgomery methods, to enact the P operator on A·B, the following process may be employed, using the precomputed constant J:

1) $X = A \cdot B$
2) $Y = (X \cdot J) \bmod 2^n$ (only the n LS bits are necessary)
3) $Z = X + Y \cdot N$
4) $S = Z/2^n$ (The requirement on J is that it forces Z to be divisible by $2^n$)
5) P¥S mod N (N is to be subtracted from S, if S≧N) Finally, at step 5):

P¥℘(A·B)N,

[After the subtraction of N, if necessary: $P = \wp(A \cdot B)N$.]
Following the above:

$Y = A \cdot B \cdot J \bmod 2^n$ (using only the n LS bits);

and:

$Z = A \cdot B + (A \cdot B \cdot J \bmod 2^n) \cdot N$.

In order that Z be divisible by $2^n$ (the n LS bits of Z are preferably zero) and the following congruence will exist:

$[A \cdot B + (A \cdot B \cdot J \bmod 2^n) \cdot N] \bmod 2^n = 0$

In order that this congruence will exist, $N \cdot J \bmod 2^n$ are congruent to $-1$ or:

$J = -N^1 \bmod 2^n$.

and we have found the constant J.

J, therefore, is a precomputed constant which, is a function of N only. However, in a machine that outputs a MM result, bit by bit, provision should be made to add in Ns at each instance where the output bit in the LS string would otherwise have been a zero, thereby obviating the necessity of precomputing J and subsequently computing $Y = A \cdot B \cdot J \bmod 2^n$, as Y can be detected bit by bit using hardwired logic. We have also described that this methodic can only work for odd Ns.

Therefore, as is apparent, the process described employs three multiplications, one summation, and a maximum of one subtraction, for the given A, B, N, and a precomputed constant to obtain $\wp(A \cdot B)N$. Using this result, the same process and a precomputed constant, H, (a function of the module N) we are able to find A B mod N. As A can also be equal to B, this basic operator can be used as a device to square or multiply in the modular arithmetic.

Interleaved Montgomery Modular Multiplication

The previous section describes a method for modular multiplication which involved multiplications of operands which were all n bits long, and results which required $2^n + 1$ bits of storage space.

Using Montgomery's interleaved reduction (as described in the aforementioned paper by Dussé), it is possible to perform the multiplication operations with shorter operands, registers, and hardware multipliers; enabling the implementation of an electronic device with relatively few logic gates.

First we will describe how the device can work, if at each iteration of the interleave, we compute the number of times that N is added, using the $J_0$ constant. Later, we describe how to interleave, using a hardwire derivation of $Y_0$, which will eliminate the $J_{0+}$phase of each multiplication {2) in the following example}, and enable us to integrate the functions of two separate serial/multipliers into the new single generic multiplier which can perform $A \cdot B + C \cdot N + S$ at better than double speed using similar silicon resources.

Using a k bit multiplier, it is convenient to define characters of k bit length; there are m characters in n bits; i.e., $m \cdot k = n$.

$J_0$ will be the LS character of J.
Therefore:

$J_0 = -N_0^{-1} \bmod 2^k$ ($J_0$ exists as N is odd).

Note, the J and $J_0$ constants are compensating numbers that when enacted on the potential output, tell us how many times to add the modulus, in order to have a predefined number of least significant zeros. We will later describe an additional advantage to the present serial device; since, as the next serial bit of output can be easily determined, we can always add the modulus (always odd) to the next intermediate result. This is the case if, without this addition, the output bit, the LS serial bit exiting the CSA, would have been a "1"; thereby adding in the modulus to the previous even intermediate result, and thereby promising another LS zero in the output string. Remember, congruency is maintained, as no matter how many times the modulus is added to the result, the remainder is constant.

In the conventional use of Montgomery's interleaved reduction, $\wp(A \cdot B)N$ is enacted in m iterations as described in steps (1) to (5):

Initially $S(0) = 0$ (the ¥ value of S at the outset of the first iteration). For $i = 1, 2 \ldots m$:

1) $X = S(i-1) + A_{i-1} \cdot B$ ($A_{i-1}$ is the i-1 th character of A; $S(i-1)$ is the value of S at the outset of the i'th iteration.)
2) $Y_0 = X_0 \cdot J_0 \bmod 2^k$ (The LS k bits of the product of $X_0 \cdot J_0$)
   (The process uses and computes the k LS bits only, e.g., the least significant 64 bits)
   In the preferred implementation, this step is obviated, because in a serial machine $Y_0$ can be anticipated bit by bit.
3) $Z = X + Y_0 \cdot N$
4) $S(i) = Z/2^k$ (The k LS bits of Z are always 0, therefore Z is always divisible by $2^k$. This division is tantamount to a k bit right shift as the LS k bits of Z are all zeros; or as will be seen in the circuit, the LS k bits of Z are simply disregarded.
(5) $S(i) = S(i) \bmod N$ (N is to be subtracted from those $S(i)$'s which are larger than N).

Finally, at the last iteration (after the subtraction of N, when necessary), $C = S(m) = \wp(A \cdot B)N$. To derive $F = A \cdot B \bmod N$, the P field computation, $\wp(C \cdot H)N$, is performed It is desired to know, in a preferred embodiment, that for all $S(i)$'s, $S(i)$ is smaller than 2N. This also means, that the last result ($S(m)$) can always be reduced to a quantity less than N with, at most, one subtraction of N.

We observe that for operands which are used in the process:

$S(i-1) < 2^{n+1}$ (the temporary register can be one bit longer than the B or N register), $B < N < 2^n$ and $A_{i-1} < 2^k$.

By definition:

$S(i) = Z/2^k$ (The value of S at the end of the process, before a possible subtraction)

For all Z, $Z(i) < 2^{n+k+1}$.

$X_{max} = S_{max} + A_i \cdot B < 2^{n+1} - 1 + (2^k - 1)(2^n - 1)$ $Q_{max} = Y_0 N < (2^k - 1)(2^n - 1)$ therefore:

$$Z_{max} < 2^{k+n+1} - 2^{k+1} + 1 < 2^{k+n+1} - 1.$$

and as $Z_{max}$ is divided by $2^k$:

$$S(m) < 2^{n+1} - 2^1.$$

Because $N_{min} > 2^n - 2$, $S(m)_{max}$ is always less than $2 \cdot N_{min}$, and therefore, one subtraction is all that is necessary on a final result.

$$S(m)_{max} - N_{min} = (2^{n+1} - 2^1 - 1) - (2^n - 1) = 2^n - 4 < N_{min}.$$

Example of a Montgomery interleaved modular multiplication:

The following computations in the hexadecimal format clarify the meaning of the interleaved method:
N=a59, (the modulo), A=99b, (the multiplier), B=5c3 (the multiplicand), n=12, (the bit length of N), k=4, (the size in bits of the multiplier and also the size of a character), and m=3, as n=k·m.
$J_0=7$ as $7 \cdot 9 \equiv -1$ mod 16 and $H = 2^{2 \cdot 12}$ mod a59=44b.
The expected result is F=A·B mod N=99b·5c3 mod a59=375811 mod a59=$220_{16}$.
Initially: S(0)=0
Step 1 X=S(0)+$A_0$·B=0+b·5c3=3f61
  $Y_0 = X_0 \cdot J_0$ mod $2^k = 7$ ($Y_0$—hardwire anticipated in new MAP)
  Z=X+$Y_0$·N=3f61+7·a59=87d0
  S(1)=Z/$2^k$=87d
Step 2 X=S(1)+$A_1$·B=87d+9·5c3=3c58
  $Y_0 = X_0 \cdot J_0$ mod $2^k = 8 \cdot 7$ mod $2^4 = 8$ (Hardwire anticipated)
  Z=X+$Y_0$·N=3c58+52c8=8f20
  S(2)=Z/$2^k$=8f2
Step 3 X=S(2)+$A_2$·B=8f2+9·5c3=3ccd
  $Y_0 = d \cdot 7$ mod $2^4 = b$ (Hardwire anticipated)
  Z=X+$Y_0$·N=3ccd+b·a59=aea0
  S(3)=Z/$2^k$=aea,
as S(3)>N,
  S(m)=S(3)−N=aea−a59=91
Therefore C=$\emptyset$(A·B)N=$91_{16}$.
Retrieval from the P field is performed by computing $\emptyset$(C·H)N:
Again initially: S(0)=0
Step 1 X=S(0)+$C_0$·H=0+1·44b=44b
  $Y_0$=d (Hardwire anticipated in new MAP)
  Z=X+$Y_0$·N=44b+8685=8ad0
  S(1)=Z/$2^k$=8ad
Step 2 X=S(1)+$C_1$·H=8ad+9·44b=2f50
  $Y_0$=0 (Hardwire anticipated in new MAP)
  Z=X+$Y_0$·N=2f50+0=2f50
  S(2)=Z/$2^k$=2f5
Step 3 X=S(2)+$C_2$·H=2f5+0·44b=2f5
  $Y_0$=3 (Hardwire anticipated in new MAP)
  Z=X+$Y_0$·N=2f5+3·a59=2200
  S(3)=Z/$2^k$=$220_{16}$
which is the expected value of 99b 5c3 mod a59.
If at each step we disregard k LS zeros, we are in essence multiplying the n MS bits by $2^k$. Likewise, at each step, the i'th segment of the multiplier is also a number multiplied by $2^{ik}$, giving it the same rank as S(i).

It can also be noted that in another preferred embodiment, wherein it is of some potential value to know the $J_0$ constant.

Exponentiation

The following derivation of a sequence [D. Knuth, The art of computer programming, vol. 2: Seminumerical algorithms, Addison-Wesley, Reading, Mass., 1981] hereinafter referred to as "Knuth", explains a sequence of squares and multiplies, which implements a modular exponentiation.

After precomputing the Montgomery constant, $H = 2^{2n}$, as this device can both square and multiply in the P field, we compute:

$$C = A^E \bmod N.$$

Let E(j) denote the j bit in the binary representation of the exponent E, starting with the MS bit whose index is 1 and concluding with the LS bit whose index is q, we can exponentiate as follows for odd exponents:

A*≡$\emptyset$(A·H)N  A* is now equal to A·$2^n$.

B=A*

FOR j=2 TO q−1
  B≡$\emptyset$(B·B)N

IF E(j)=1 THEN
  B≡$\emptyset$(B·A*)N

ENDFOR

B≡$\emptyset$(B·A)N E(0)=1; B is the last desired temporary result multiplied by $2^n$, A is the original A.

C=B

C=C−N if C≧N.

After the last iteration, the value B is Ұ to $A^E$ mod N, and C is the final value.
To clarify, we shall use the following example:

E=1011→E(1)=1; E(2)=0; E(3)=1; E(4)=1;

To find $A^{1011}$ mod N; q=4

A*=$\emptyset$(A·H)N=A$I^{-2}$·I=A$I^{-1}$ mod N

B=A*

FOR j=2 to q
  B=$\emptyset$(B·B)N which produces: $A^2(I^{-1})^2 \cdot I = A^2 \cdot I^{-1}$ E(2)=0; B=$A^2 \cdot I^{-1}$
  j=3 B=$\emptyset$(B·B)N=$A^2(I^{-1})^2 \cdot I = A^4 \cdot I^{-1}$
  E(3)=1 B=$\emptyset$(B·A*)N=$(A^4 \cdot I^{-1})(AI^{-1}) \cdot I = A^5 \cdot I^{-1}$
  j=4 B=$\emptyset$(B·B)N=$A^{10} \cdot I^{-2} \cdot I = A^{10} \cdot I^{-1}$ As E(4) was odd, the last multiplication will be by A, to remove the parasitic $I^{-1}$.

B=$\emptyset$(B·A)N=$A^{10} \cdot I^{-1} \cdot A \cdot I = A^{11}$

C=B

A method for computing the H parameter by a reciprocal process is described in U.S. Pat. No. 5,513,133.

A Long Division Process

Figure 2:
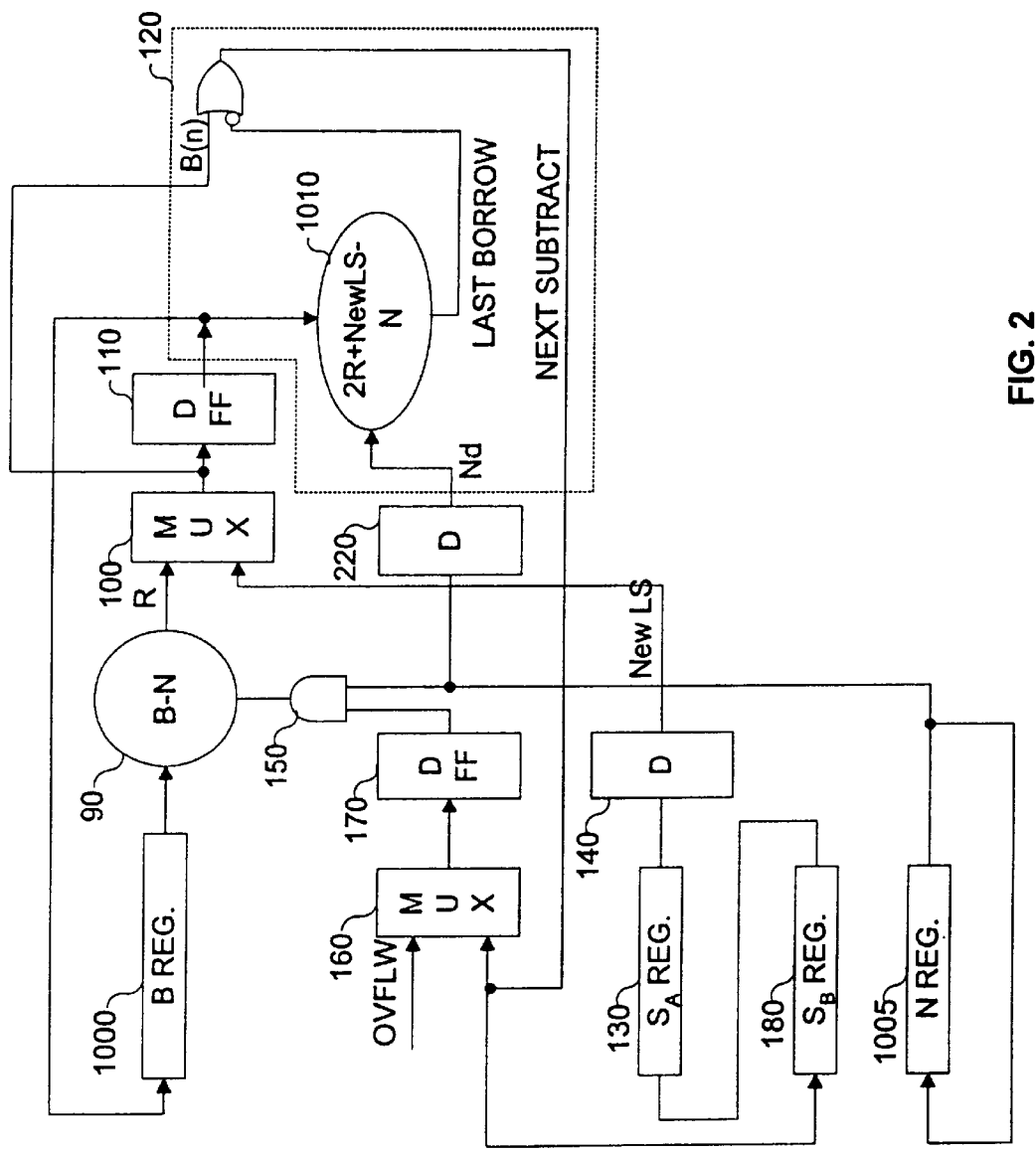
FIG. 2 is a simplified block diagram of a preferred implementation of the serial integer division apparatus of FIG. 1A which is also useful separately for serial integer division applications, particularly for very large numbers.

FIG. 2 illustrates a preferred embodiment of a deterministic processing device for performing long division, using the data manipulation devices available on the processor of FIG. 1A.

FIGS. 4 and 5 are examples of the operation of the apparatus of FIG. 2.

In a division process, wherein the divisor, d, is in the range of d, $2^{n-1} < d < 2^n$; and the dividend, D, is in the range of D, $2^{2n-1} < D < 2^{2n}$; the apparatus is used most simply. d is preloaded into the N right-shift register, 1005 (a concatenation of the $N_0$ and the $N_1$ registers, 210 and 200) in FIG. 2, the MS n bits of the dividend, D, are preloaded in the B right-shift register, 1000, and the n LS bits of D are reverse loaded into the $S_A$ right shift register 130. This is essentially, as one would arrange digits for manual long division realizing that the new LS bits are fed from $S_A$ to $S_B$ at each new trial subtraction. The $S_B$ register is preloaded with all zeros.

In the initialization iteration, the overflow flip flop 170 of FIG. 2 is initially reset. The N register, which now contains the divisor, d, is trial subtracted from B, the MS bits of D, whilst both the B and N registers are rotated; wherein their outputs are fed into the serial subtractor 90, whose output is B-fN, f=1 for subtract, f=0, for don't subtract. The quotient generator, 120, is a detector which determines if B≧N, and transmits a NEXT SUBTRACT which determines if d will be subtracted from B, in 90, in the next iteration; this signal is a one, if, and only if, B is larger than or equal to N. This NEXT SUBTRACT bit denotes success, and is the most significant bit of the quotient, and is also clocked into the $S_B$ register, 180. As this is clocked into the $S_B$ register, a zero is shifted out of the $S_B$ register, into the $S_A$ register, forcing a NEW LS BIT out of the $S_A$ register. Note, that as these registers are all right shift registers, both the quotient in $S_B$ and the dividend value in $S_A$, are held in reverse order.

In the next iterations, at the first effective clock cycle, a NEW LS BIT, shifted out of the $S_A$ precedes the output, R, of 90, thereby multiplying R by 2 and adding the value of the NEW LS BIT to 2R. This concatenated value is rotated back into the B register, and is also tested in 120, to determine if on the next round f=1 or f=0.

Finally, the remainder is in the B register, n bits of the quotient are in the $S_B$ register and the most significant bits of the quotient are in the $S_A$ register.

The most significant one of both the dividend and the divisor is preferably in the most significant bit cells of the B register and the N register, for all sizes of D and d. The number of iterations necessary to obtain a result is decreased for Ds which are smaller than $2^{2n-1}$, and is increased for ds which are smaller than $2^{n-1}$. The device is hardware driven, and firmware compensations may be provided for shifting operands when unloading the device.

Figure 3:
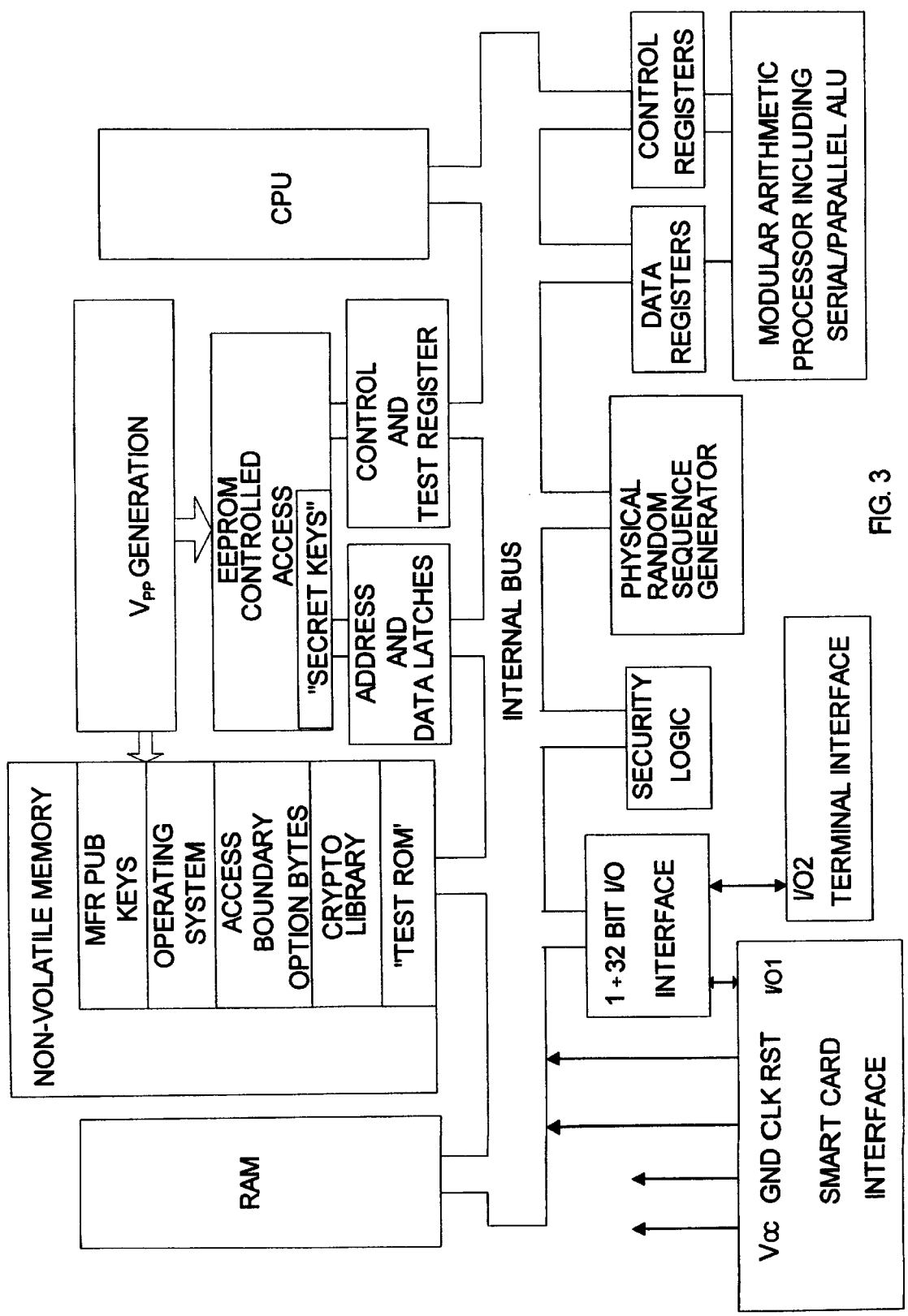
FIG. 3 is a simplified block diagram of a public key crypto-computer for smart cards or terminus which includes the serial-parallel arithmetic logic unit of FIGS. 1A–1B.

The program residing in the non-volatile memory of FIG. 3, preferably ascertains that the registers are loaded, and defines for the control register, a number of iterations necessary for a successful division process. The quotient bits are rereversed, byte by byte, when processed through the reverse data out unloader, units 60 and 40.

This processor is an element useful for computing the H Parameter, and also is preferably used in computations of the Euclidean functions.

The serial integer division apparatus of FIG. 1A and the double acting multiplier of FIG. 1B which performs A×B+ C×D+S, typically do not operate simultaneously.

In the example of FIG. 4, the dividend B is 187 (10111011), the divisor N is 7 (111), and once division is carried out, the quotient is found to be 20 (10100) and the remainder is found to be 7 (111).

In the example of FIG. 5, the dividend B is 173 (10101101), the divisor N is 5 (101), and once division is carried out, the quotient is found to be 34 (100010) and the remainder is found to be 3 (11).

A carry-save accumulator is illustrated in FIG. 5 of U.S. Pat. No. 5,513,133 to Gressel.

A serial full adder is illustrated in FIG. 7 of the above-referenced U.S. Patent to Gressel.

A serial subtracter is illustrated in FIG. 8 of the above-referenced U.S. Patent to Gressel.

Division apparatus is illustrated in FIG. 9 of the above-referenced U.S. Patent to Gressel.

The term "normal field of integers" refers to non-negative integers e.g. natural numbers.

According to a preferred embodiment of the present invention, the system shown and described herein is operative to compute $J_0$ by resetting a and b to zero and setting $S_0=1$.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A microelectronic apparatus for performing a Montgomery type modular multiplication of $P(A_i \cdot B)N$, wherein $A_i$ is a multiplicand, B is a multiplier and N is a modulus, which is limited congruent to a remainder of $A_i$, times B, over N, times $2^{-k}$, input operands being at least n bits in length, and a result being at least 2k+1 bits long, including k disregarded least significant zero bits, which are not saved, where k is not less than n, the apparatus comprising:

a first (B), and second (N) main memory register, each register holding at least one at least n bit long operand, said registers being respectively operative to store the multiplier, and the modulus, wherein the modulus is odd and is smaller than $2^n$;

a modular multiplying device for at least k bit input multiplicands, with only one carry save adder, being at least k+1 bits long, and being operative to accept k bit multiplicands, the multiplication device operative to switch into the carry save adder, in turn, multiplicand values, and in turn to receive multiplier values from a B register, and an "on the fly" simultaneously generated anticipated value, $Y_0$, as a multiplier which is operative to force k least significant zero output bits in the first phase, wherein at each effective machine cycle at least one designated multiplicand is added into the carry save adder;

a digital logic sensing detector, operative to form the "on the fly" anticipated value, $Y_0$, indicating when a modulus value is to be added to the value in the carry save adder such that all first k least significant multiplication output bits are forced to zero;

the multiplicand values to be switched in turn into the carry save adder consisting of one or two of the following three multiplicands, an all-zero string value, the multiplicand $A_i$, and the modulus value N;

the multiplier values which are input in turn into the multiplying device in the first phase being first the B operand, and concurrently, the second multiplier value consisting of the "on the fly" anticipated value, $Y_0$, in the form of a k bit string, to force least significant zeroes in the output;

the carry save adder being operative to output values simultaneously as multiplicands are added into the carry save adder;

an output transfer mechanism, operative in a second phase to output a final P(A·B)N result from the carry save adder.

2. Apparatus as in claim 1 wherein summations into the carry save adder are activated by successively higher order multiplier bits loaded one after another serially.

3. Apparatus as in claim 2, wherein the successively loaded multiplier bits:

are operative to cause no summation into the carry save adder if both the input multiplier bit and a corresponding input $Y_0$ bit are zeroes;

are operative to add in only the $A_i$ multiplicand if the input multiplier bit is a one and the corresponding $Y_0$ bit is a zero;

are operative to add in only the N, modulus, if the multiplier bit is a zero, and the corresponding $Y_0$ bit is a one; and are operative to add in the summation of the modulus, N, with the multiplicand $A_i$ if both the input multiplier bit and the corresponding $Y_0$ bit are ones.

4. Apparatus according to claim 3, operative to preload multiplicand values $A_i$ and modulus values N, into two designated preload buffers, and to summate these values into a third multiplicand preload buffer, obviating the necessity of adding in each multiplicand value separately, when corresponding multiplier and $Y_0$ bits are both ones.

5. Apparatus as in claim 4, where the preload buffers are serially fed and where multiplicand values are preloaded into the preload buffers on the fly from any of the registers or from the CPU via any of the registers.

6. Apparatus as in claim 1, wherein the multiplier values are serially input and the output of the carry save adder is serially output, wherein the detect device is operative to anticipate, on only one bit, whether the modulus value is to be added into the carry save adder.

7. Apparatus as in claim 6 wherein k LS zeroes egress from the modular multiplying device controlled by the following three quantities in anticipating a next $Y_0$ bit:

i) the LS bit of the $A_i$ register AND the next bit of the B Stream, $A_0 \cdot B_d$;

ii) the LS Carry Out bit from the carry save adder, $CO_0$;

iii) the $S_{out}$ bit from the second LS cell of the carry save adder, $SO_1$.

8. Apparatus as in claim 7, wherein the three values $A_0 \cdot B_d$, $CO_0$, and $SO_1$ are XORed together to output a valid $Y_0$ anticipatory bit.

9. Apparatus as in claim 1 wherein k LS zeroes egress from the modular multiplying device controlled by the following three quantities in anticipating a next $Y_0$ bit:

i) the LS bit of the $A_i$ register AND the next bit of the B Stream, $A_0 \cdot B_d$;

ii) the LS Carry Out bit from the carry save adder, $CO_0$;

iii) the $S_{out}$ bit from the second LS cell of the carry save adder, $SO_1$.

10. Apparatus as in claim 9, wherein the three value, $A_0 \cdot B_d$, $CO_0$, and $SO_1$ are XORed together to output a valid $Y_0$ anticipatory bit.

11. Apparatus according to claim 1, further comprising a comparator operative to sense an output from the modular multiplying device, of which output the LS k bits are disregarded, wherein the output is larger than the modulus, N, and smaller than 2N, the comparator being operative to control a modular reduction using a value output from the memory register to which an output stream from the multiplier device is destined, thus avoiding the need to allot a second memory storage device for smaller Montgomery product values.

12. Apparatus as in claim 1, wherein a serial comparator is operative to sense when an output $Z/2^k$, from the modular multiplication device is larger than $2^n$, thereby being operative to set an overflow bit.

13. Apparatus as in claim 1, which, when the $Y_0$ multiplier input is replaced by a constant zero input, is operative to perform natural integer multiplication of $A_i$ times B in the normal field of integers.

14. An apparatus, as in claim 1, which, when the $Y_0$ multiplier input is replaced by a constant zero input, is operative to perform natural integer multiplication of $A_i$ times B whilst another value, S, emanating from an n bit register, is summatable therewith to generate a value $A_i$ times B plus S.

15. Apparatus according to claim 1, which, when the $Y_0$ multiplier input is replaced by the output of a memory register operative to feed an operand C, and the operand N is replaced by an alternative operand D, is operative to perform natural integer multiplication of $A_i$ times B and C times D whilst another value, S, emanating from another register, is summatable therewith in the normal field of integers so as to generate a value $A_i$ times B plus C times D plus S.

16. Apparatus as in claim 1 with which Montgomery modular multiplication is performable with only one pre-computed Montgomery variable, and not requiring the use of a $J_0$ Montgomery constant.

17. The apparatus of claim 1, wherein a Montgomery $J_0$ constant is computed by resetting both the A operand value and the B operand value to zero and setting a partial result value, $S_0$, to 1.

18. Apparatus for performing a Montgomery type modular multiplication denoted P(A·B)N which is congruent to $A \cdot B \cdot 2^{-n}$ mod N in the normal field of natural integers, wherein n is larger than k, the multiplication process being performable in iterations in a plurality of phases including a first phase, a second phase, and a final phase, with input operands into a multiplying device, the operands at each iteration consisting of modulus N, a multiplier B, a previously computed partial result, $S_{n-1}$, and a k-bit string segment of A, a multiplicand, the segments progressing from the $A_0$ string segment to the $A_{m-1}$ string segment, wherein each iterative result is summated into a next temporary result $S_n$, in turn, wherein LS bits of iterative results are zeroes, the apparatus comprising:

first (B), second (S) and third (N) main memory registers, each register capable of storing and outputting operands and being respectively operative to store the multiplier value B, the partial result values at each respective stage S and the modulus N;

a modular multiplying device operative to summate into a single carry save adder with at least k bits in turn one or two of a plurality of multiplicand values during phases of the iterative multiplication process, and in turn to receive, as multipliers, an input from the B register, a value, $Y_0$, from an "on the fly" anticipating unit usable as a multiplier to force LS zero output bits in each iteration, and values from the modulus, N, register;

the multiplicand parallel registers operative at least to receive in turn, values from the A, B, and N register sources, and in turn, also the value $Y_0$, being a multiplicand zero forcing value;

a LS zero forcing $Y_0$ detector device operative to generate a binary string operative to be a multiplier during the first phase and operative to be a multiplicand in the second phase;

multiplicand values to be switched into the carry save adder for the first phase comprising a first zero value, a second value, $A_i$, which is a k bit string segment of a multiplicand, A, and a third value $N_0$, being the least significant k bits of the modulus, N;

wherein a temporary result value, $S_{n-1}$, resulting from a previous iteration, is operative to be summated with a value emanating from the carry save adder, to generate a partial result $S_n$ for the next iteration;

multiplicand values to be input, in turn, into the carry save adder for the second phase being, a first zero value, a second $A_i$ operand, remaining in place from the first phase, and a third $Y_0$ value having been anticipated in the first phase;

multiplier values input into the multiplying device in the first phase being an LS string, $B_0$, being the least significant string segment of the B operand, concurrently multiplying with the second multiplier value consisting of an anticipated $Y_0$ string which is simultaneously loaded into a preload multiplicand buffer for the second phase;

the two multiplier values input into the apparatus during the second phase being the MS n-k bit values from the multiplier B, and the n-k bits of the modulus, N, respectively; and a multiplying flush out device operative in the last phase to transfer the MS segment of a result value remaining in the carry save adder into a result register.

19. Apparatus as in claim 18, operative to anticipate the $Y_0$ value using LS values of the multiplicand, and present inputs of the multiplier, B, carry out values from the carry save adder, summation values from the carry save adder, the present values from the previously computed partial result $S_{n-1}$, and carry out values from the adder which summates the result from the carry save adder with the previous partial result.

20. Apparatus as in claim 19, for anticipating the next $Y_0$ bit, $Y_{0i}$, operative to use binary values:

i) the LS bit of the $A_i$ AND the next bit of the Bd Stream, $A_0 \cdot B_d$;

ii) the LS Carry Out bit from the carry save adder, $CO_0$;

iii) the $S_{out}$ bit from the second LS cell of the carry save adder, $SO_1$;

iv) the next bit from the S stream, $S_d$; and v) the Carry Out bit from the Full Adder, $CO_z$;

and is operative to XOR the values together as defined by $-Y_{0i} = A_0 \cdot B_d \oplus CO_0 \oplus SO_1 \oplus S_d \oplus CO_z$.

21. An apparatus as in claim 18 comprising at least one subtractor sensor operative to compare the output result to N, the modulus, the subtractor mechanism operative to actuate a second subtractor to reduce the modulus value from the larger than N result value, thereby to output a modular reduced value which is limited congruent to the output result value, and a smaller than N value as output from an allotted register, thus avoiding any need to allot a second memory storage for any smaller result.

22. Apparatus as in claim 18 in which a carry out sensor is operative to determine if an output result operand, after disregarding k zeroes, is larger than $2^{n-1}$, wherein the sensor is operative to actuate an overflow flag.

23. Apparatus as in claim 18 where a value which is a summation of two multiplicands is loaded into a preload k+1 bit buffer memory register concurrently whilst one of the multiplicands is loaded into a preload buffer.

24. Apparatus as in claim 18 wherein next use multiplicands are preloaded into preload register buffer on the fly.

25. Apparatus as in claim 18 wherein, if both multiplier bits are zeroes, an all zero k bit multiplicand is added into the carry save adder, wherein if the B multiplier bit is one and the second multiplier bit is zero, a value in the $A_i$ register is added into the carry save adder, and if the second multiplier bit is one and the B multiplier bit is zero, the second multiplicand is added into the carry save adder, and if both multiplier bits are ones then the summation $A_i + N_0$ is added into the carry save adder during the first phase, and wherein $A_i + Y_0$ is added into the carry save adder during the next phase.

26. Apparatus as in claim 18 wherein buffers and registers are operative to be loaded with values from external memory sources and said buffers and registers are operative to be unloaded into an external memory source during computations, such that the maximum size of the operands is dependent on available memory.

27. Apparatus as in claim 18 wherein a main memory register comprises at least one of a group comprising serial in/serial out, parallel in/parallel out, serial in/parallel out, and parallel in/serial out memory registers.

28. Apparatus as in claim 18 wherein at the final phase of a Montgomery multiplication type iteration, the multiplier inputs are zeroes operative to flush out the MS segment of the carry save adder memory.

29. An apparatus as in claim 18 where next use multiplicands are preloaded into a preload memory buffer on the fly.

30. An apparatus as in claim 18 wherein multiplicand values are preloaded into the preload buffers on the fly from a central storage memory.

* * * * *